(12) United States Patent
Byun et al.

(10) Patent No.: US 8,547,197 B2
(45) Date of Patent: Oct. 1, 2013

(54) BENDING SENSOR AND METHOD FOR FABRICATING THE SAME

(75) Inventors: Kang-Ho Byun, Gyeonggi-do (KR); Byung-Jik Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 27 days.

(21) Appl. No.: 13/173,781

(22) Filed: Jun. 30, 2011

(65) Prior Publication Data

US 2012/0256720 A1 Oct. 11, 2012

(30) Foreign Application Priority Data

Apr. 8, 2011 (KR) .................. 10-2011-0032828

(51) Int. Cl.
*G01L 1/22* (2006.01)
(52) U.S. Cl.
USPC .................................. 338/2; 338/99; 338/114
(58) Field of Classification Search
USPC ........................................ 338/2, 114, 210, 99
See application file for complete search history.

(56) References Cited

U.S. PATENT DOCUMENTS

| | | | | |
|---|---|---|---|---|
| 5,086,785 A * | 2/1992 | Gentile et al. | | 600/595 |
| 7,248,142 B2 * | 7/2007 | Beck et al. | | 338/211 |
| 7,274,413 B1 * | 9/2007 | Sullivan et al. | | 349/43 |
| 7,277,004 B2 * | 10/2007 | Beck et al. | | 338/22 R |
| 8,256,123 B2 * | 9/2012 | Lee et al. | | 33/1 PT |
| 2006/0096392 A1 * | 5/2006 | Inkster et al. | | 73/862.041 |
| 2008/0158171 A1 * | 7/2008 | Wong et al. | | 345/173 |

FOREIGN PATENT DOCUMENTS

| KR | 1020090087303 A | 8/2009 |
|---|---|---|
| KR | 1020100024787 A | 3/2010 |

* cited by examiner

*Primary Examiner* — Kyung Lee
(74) *Attorney, Agent, or Firm* — The Farrell Law Firm, P.C.

(57) ABSTRACT

A bend-detecting (bending) sensor is provided, including a flexible substrate, at least a pair of electrode patterns spaced apart from each other provided on the flexible substrate, and a paste layer containing conductive particles. The paste layer is coated onto the flexible substrate where the electrode patterns are formed, such that when the flexible substrate is bent, the density of the conductive particles between the electrode patterns changes and an electric resistance between the electrode patterns also changes, thereby sensing deformation of the flexible substrate, and eventually, a target to which the flexible display element or the flexible substrate is attached. When the bending sensor is applied to the flexible display device, the electrode patterns and the paste layer may be formed on the flexible substrate which is to form the flexible display element, thus forming a bending sensing structure with a thickness of the flexible display element or less.

11 Claims, 10 Drawing Sheets

BENDING SENSOR AND METHOD FOR FABRICATING THE SAME

PRIORITY

This application claims priority under 35 U.S.C. §119(a) to a Korean Patent Application filed in the Korean Intellectual Property Office on Apr. 8, 2011 and assigned Serial No. 10-2011-0032828, the contents of which are hereby incorporated by reference.

BACKGROUND OF THE INVENTION

1. Field of the Invention

The present invention relates generally to a bending sensor and a method for fabricating the same, and more particularly to a bending sensor which is easily applicable to a flexible display device, and a method for fabricating the bending sensor.

2. Description of the Related Art

Generally, a display device refers to a device having a screen which provides image signal. The display device has been widely used in daily life for not only portable terminals, such as cellular phones, Portable Multimedia Players (PMPs), etc., but also electric appliances, such as navigation systems for vehicles, TVs, laundry machines, refrigerators, etc.

With the common use of a flat-panel display element such as a Liquid Crystal Display (LCD), the display element can now be mounted on a small-size device such as a portable terminal. Recently, a combination of a touch screen panel and a display device allows for the implementation of a virtual keypad on a screen in place of a physical keypad of the portable terminal.

Meanwhile, a flexible display element using a Thin Film Transistor (TFT) Liquid Crystal Display (LCD) device has been developed, and much effort has been made to commercialize the flexible display device. As multimedia functions of a portable terminals are emphasized more and more, the size of the display device becomes a key factor for determining the specifications of a product. However, in terms of portability of the portable terminal, there is a limitation in increasing the size of the display device to support the multimedia functions. If the display device can be folded or bent under such real conditions, the portability of the portable terminal may be maintained while increasing the size of the display device. Therefore, commercialization of the flexible display element which is foldable or bendable would be valuable, especially in the field of portable terminals.

In commercialization of the flexible display element, for control of the flexible display element, it is necessary to account for the degree and direction in which the flexible display element is folded or bent. That is, a control operation needs to allow for adjusting a region and direction in which a screen is actually presented according to the degree and direction of the folding or bending of the flexible display element, and therefore, the degree and direction of the folding or bending of the flexible display element is preferably measured.

A bend-detecting or bending sensor is used to measure and detect deformation of various materials as well as the flexible display element. The bending sensor is used to monitor a property change occurring during the hardening process of concrete or synthetic resin and detects cracks or deformation after the hardening process. The bending sensor is also useful for monitoring cracks, deformation, and so forth in aircrafts, ships, etc.

As a bending sensor for measuring a degree and direction in which the flexible display element is folded or bent, a structure using a transparent electrode material or a hole sensor used in touch screen technology has been proposed.

In a transparent electrode material, a representative example of which is an Indium-Tin Oxide (ITO) film, a plurality of horizontal electrodes and a plurality of vertical electrodes are arranged to intersect each other. Such transparent electrode material has been used not only in the field of display devices, but also in the field of touch screen technology.

According to the bending sensing technology using the transparent electrode material, a separate ITO film is attached to an inner surface or an outer surface of the flexible display element, increasing the thickness of the flexible display device and, thus, restricting the radius of curvature allowable in a folding or bending operation. In other words, as the thickness of the flexible display element increases, a displacement on the inner surface or the outer surface also increases during the folding or bending operation, involving some risk of damage to the flexible display element. The ITO film used in general touch screen technology senses a contact in a particular point, which limits sensing of simultaneous deformation in various points as in the folding or bending operation or in the degree and direction of bending.

Meanwhile, a hole-sensor based structure for sensing a magnetic field has an arrangement including a plurality of hole sensors in the widthwise or longitudinal direction of the flexible display element, and senses a change in the position of a magnetic substance disposed in a particular point, thus sensing deformation of the flexible display element. However, the hole-sensor based structure can sense deformation only under particular conditions, for example, deformation such as the rolling or folding of the flexible display element is generated only in the direction of the hole sensors. Moreover, the hole-sensor based structure cannot sense the degree and direction of folding or bending.

SUMMARY OF THE INVENTION

Accordingly, an aspect of the present invention is to provide a bending sensor, which can sense the degree and direction of folding or bending of a flexible display device while limiting the need to increase the flexible display device in size, and a method for fabricating the bending sensor.

Another aspect of the present invention is to provide a bending sensor which can variously control a flexible display element by sensing the degree and direction of folding or bending of the flexible display element, and a method for fabricating the bending sensor.

According to an aspect of the present invention, there is provided a bending sensor including a flexible substrate, at least a pair of electrode patterns spaced apart from each other provided on the flexible substrate, and a paste layer containing conductive particles, the paste layer being coated onto the flexible substrate where the electrode patterns are formed, in which when the flexible substrate is bent, the density of the conductive particles between the electrode patterns changes, such that an electric resistance between the electrode patterns also changes.

According to another aspect of the present invention, there is provided a method for fabricating a bending sensor, the method including providing a flexible substrate for fabricating the bending sensor, forming at least a pair of electrode patterns on a surface of the flexible substrate, and forming a paste layer by coating paste containing conductive particles onto the surface of the flexible substrate on which the electrode patterns are formed, in which the paste layer is coated to cover the electrode patterns.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS
OF THE PRESENT INVENTION

Hereinafter, embodiments of the present invention will be described in detail with reference to the accompanying drawings. A detailed description of known functions and configurations will be omitted when it may unnecessarily obscure the subject matter of the present invention.

Figure 1:
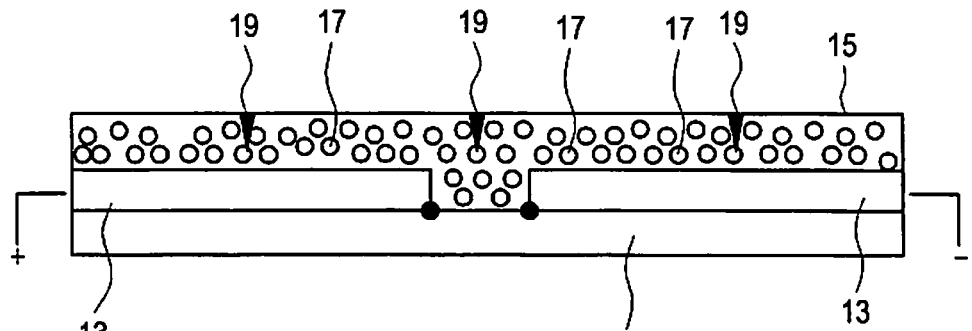
FIG. 1 is a diagram showing a bending sensor according to an embodiment of the present invention.
Figure 2:
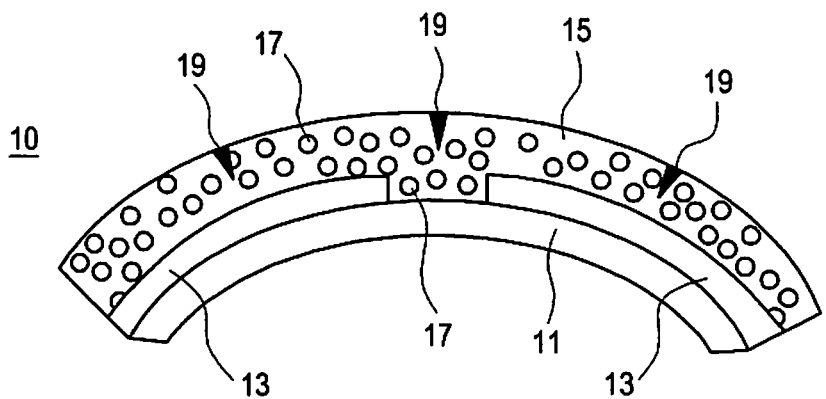
FIG. 2 is a structural diagram showing a state where the bending sensor, as illustrated in FIG. 1, is deformed in a first direction.
Figure 3:
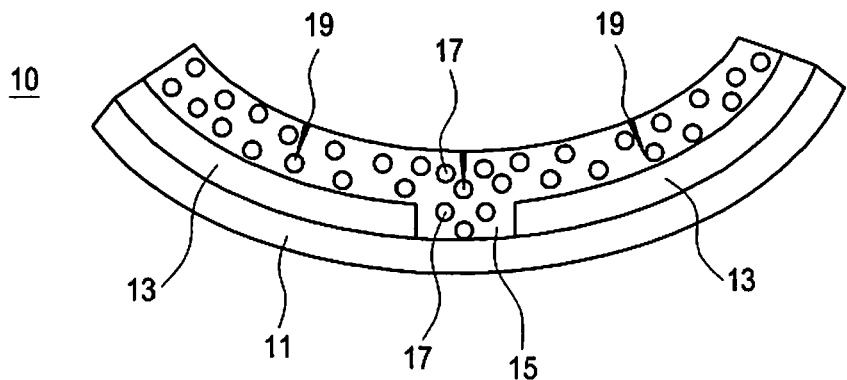
FIG. 3 is a structural diagram showing a state where the bending sensor, as illustrated in FIG. 1, is deformed in a second direction.

As shown in FIGS. 1 through 3, a bending sensor 10 according to an embodiment of the present invention is structured such that at least a pair of electrode patterns 13 are disposed spaced apart from each other on a flexible substrate 11 and a paste layer 15 is formed to cover the electrode patterns 13. The paste layer 15 may be formed with paste containing conductive particles 17 or through ink printing or screen-printing. As shown in FIGS. 2 and 3, as a distance between the electrode patterns 13 changes due to deformation of the flexible substrate 11, the density of the conductive particles 17 distributed between the electrode patterns 13 also changes. Such a change leads to a change in an electric resistance between the electrode patterns 13, causing deformation of the flexible substrate 11. The flexible substrate 11 may be attached to an object, which is a monitoring target for a property change or deformation. If the flexible substrate 11 is a portion of a flexible display element 21 and at the same time, a portion of the bending sensor 10, the bending sensor 10 may sense deformation of the flexible substrate 11.

The flexible substrate 11 may be formed using a base film for a general flexible Printed Circuit Board (PCB) or a substrate for a Thin Film Transistor (TFT) Liquid Crystal Display (LCD). The electrode patterns 13 may be formed by attaching or depositing a conductive material. To form the electrode patterns 13, after the conductive material is deposited on the flexible substrate 11, the portion of the flexible substrate 11 other than a layer where the conductive material for the electrode patterns 13 is deposited, may be removed. Such a formation process is favorable for mass production of the bending sensor 10.

More specifically, the electrode patterns 13 may be formed using the following process, which is similar to a photo-etching process. First, a conductive material layer is formed by deposition on a surface of the flexible substrate 11. The conductive material layer is formed on the entire surface of the flexible substrate 11. Next, after completion of the conductive material layer, a photoresist layer is coated onto the conductive material layer. After the photoresist is hardened, a photo-mask manufactured according to the shape and disposition of the electrode patterns 13 to be formed is disposed on the photoresist layer, which is then exposed and developed. Thereafter, etching is performed, such that the conductive material layer in a corresponding portion is removed together with the exposed photoresist. In other words, an unnecessary conductive material is removed through etching and finally, the electrode patterns 13 are formed. In this state, as will be later described below, some portion of the photoresist remains to form a protrusion portion which surrounds a region where the electrode patterns 13 are formed.

A process of forming the electrode patterns 13 may be performed concurrently with a process of forming printed circuit patterns on the flexible substrate 11. In other words, when a display element is installed on the flexible substrate 11 or the flexible substrate 11 is a portion of the flexible display element 21, the electrode patterns 13 may be formed in the course of a process of forming signal lines connected to the display element.

When the bending sensor 10 is formed, at least one pair of electrode patterns 13 are required, and in some embodiments, the bending sensor 10 preferably includes three or more electrode patterns 13.

The paste layer 15 is formed using paste coated to cover the electrode patterns 13, and contains the conductive particles 17. The conductive particles 17 are distributed between the electrode patterns 13. Thus, upon application of power to the bending sensor 10 through the electrode patterns 13, current flows between the electrode patterns 13 through the conductive particles 17.

In FIGS. 2 and 3, deformation of the bending sensor 10 is illustrated. FIG. 2 shows a state where a center portion of the bending sensor 10 is deformed upwardly. The flexible substrate 11 undergoes only a change in its shape while maintaining its substantial length. Thus, an interval between the electrode patterns 13 increases from an initial state shown in FIG. 1, and the density of the conductive particles 17 between the electrode patterns 13 decreases, increasing an electric resistance between the electrode patterns 13.

FIG. 3 shows a state where the center portion of the bending sensor 10 is deformed downwardly. The flexible substrate 11 undergoes only a change in its shape while maintaining its substantial length. Thus, the interval between the electrode patterns 13 decreases from the initial state shown in FIG. 1, and the density of the conductive particles 17 between the electrode patterns 13 increases, reducing the electric resistance between the electrode patterns 13.

In this way, where a target is attached to the flexible substrate 11 or a display element is formed with the flexible substrate 11, deformation of the flexible substrate 11 can be sensed. In addition, from a difference between the electric resistance between the electrode patterns 13 in the initial state shown in FIG. 1 and the electric resistance there between measured after deformation, the direction and the degree to which the flexible substrate 11 is deformed can be calculated.

On the surface of the paste layer 15 are preferably formed a plurality of cracks 19 to prevent the paste layer 15 from being damaged during deformation of the bending sensor 10. By forming the cracks 19, an allowable radius of curvature with which the bending sensor 10 can be deformed is increased. Even when the allowable radius of curvature with which the bending sensor 10 can be deformed is not increased, the paste layer 15 can be prevented from being damaged as long as the bending sensor 10 is deformed within the preset allowable radius of curvature. In other words, where the bending sensor 10 is repetitively deformed, fatigue is concentrated in a particular portion on the paste layer 15, resulting in an undesired crack after fabrication of the bending sensor 10. To prevent an increase in the fatigue or generation of the undesired crack, the cracks 19 are formed in advance at predetermined intervals on the surface of the paste layer 15.

Although a cross-sectional shape of each crack 19 is a triangular wedge shape in an embodiment of the present invention, it may be various shapes such as a semicircular shape, a quadrangular shape, etc.

Figure 4A:
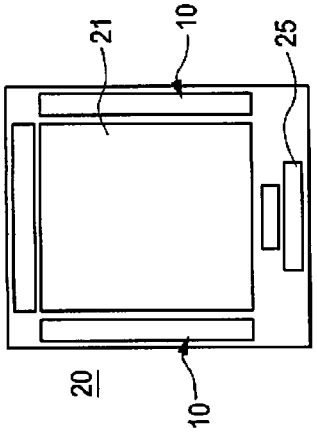
FIGS. 4A through 4F show various forms in which the bending sensor is arranged.
Figure 4B:
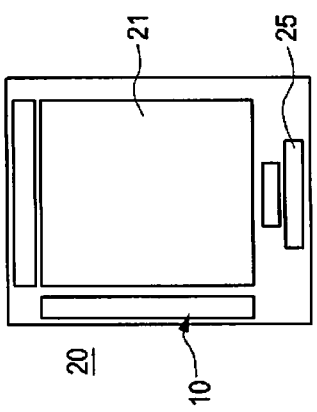
Figure 4C:
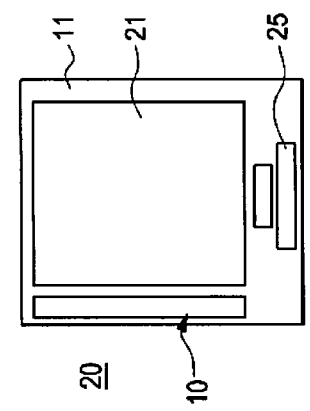

FIGS. 4A through 4F show various forms in which the bending sensor 10, as illustrated in FIG. 1, is disposed to sense folding or bending of the flexible display element 21. It can be seen from FIGS. 4A through 4F that the bending sensor 10 is positioned adjacent to a side of the flexible display element 21 along at least one of the longitudinal direction and the widthwise direction of the flexible display element 21. For example, in FIG. 4A, the one bending sensor 10 is disposed adjacent to a lateral side of the flexible display element 21 in the longitudinal direction of the flexible display element 21. The disposition of the bending sensor 10 in the longitudinal direction of the flexible display element 21 means that the electrode patterns 13 are also disposed in the longitudinal direction of the flexible display element 21. In FIG. 4B, the bending sensor 10 is disposed adjacent to the lateral side of the flexible display element 21 in the longitudinal direction of the flexible display element 21 and the bending sensor 10 is disposed adjacent to an upper side of the flexible display device (in the widthwise direction of the flexible display element 21. In FIG. 4C, the bending sensors 10 are disposed adjacent to both lateral sides and the upper side of the flexible display element 21 one-by-one.

Figure 4D:
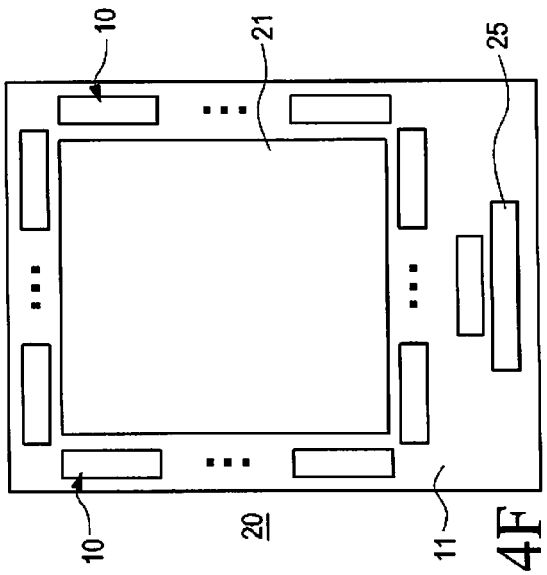
Figure 4E:
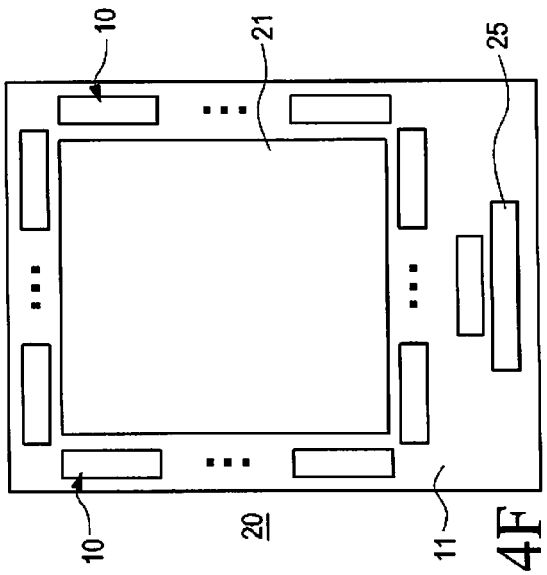
Figure 4F:
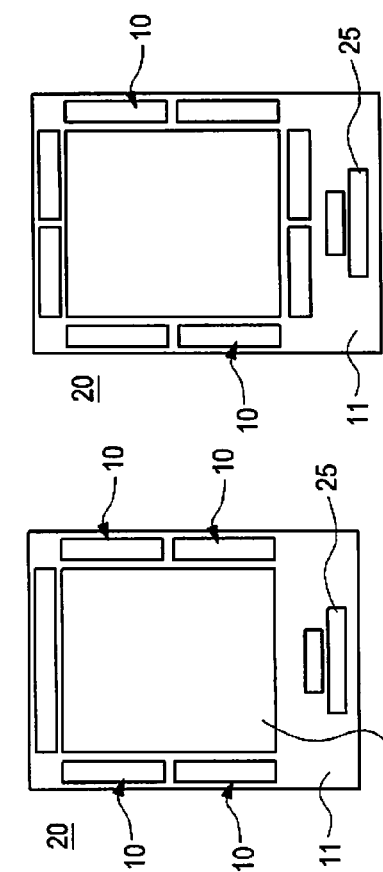

In FIGS. 4D through 4F, the number of bending sensors 10 disposed adjacent to a side of the flexible display element 21 increases and the bending sensors 10 are disposed along the circumference of the flexible display element 21. As such, the number and positions of bending sensors 10 can vary. However, if the size of the bending sensor 10 can be reduced and a greater number of bending sensors 10 can be installed in the same area, a position where the flexible display element 21 is formed and the degree and direction of the deformation in that position may be detected more precisely.

Figure 5:
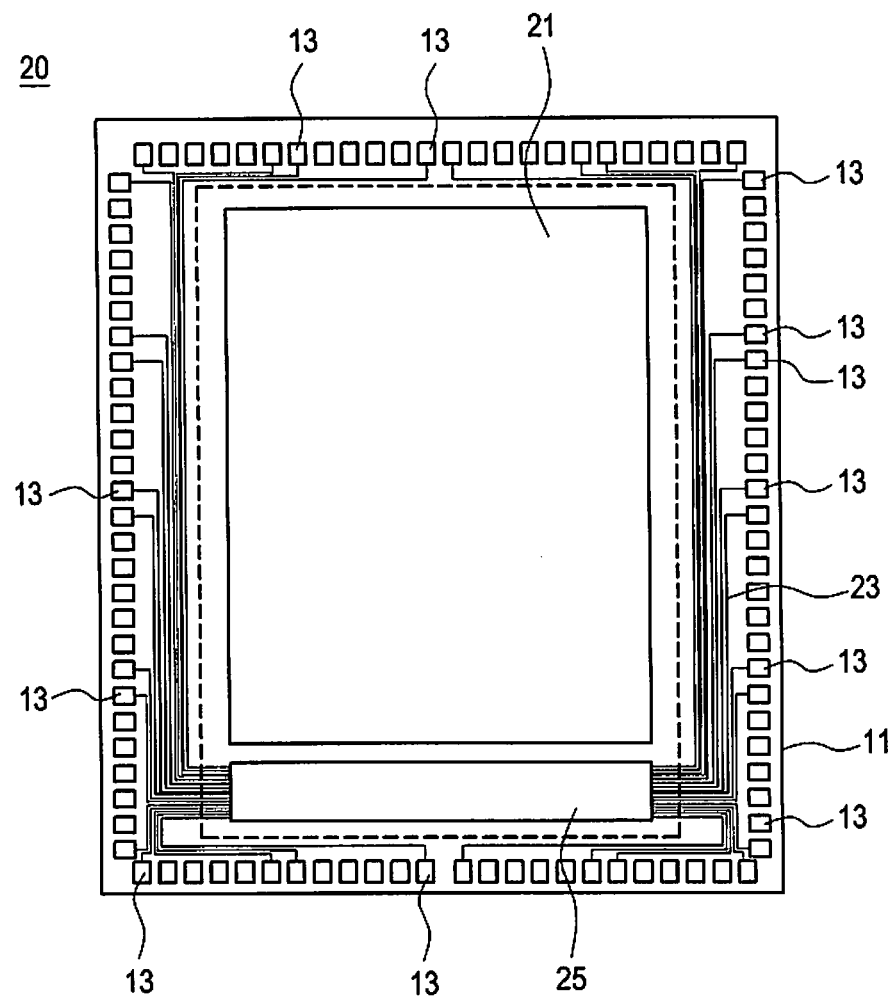
FIG. 5 is a plane view showing a state where electrode patterns of the bending sensor, as illustrated in FIG. 1, are arranged on a flexible substrate.
Figure 6:
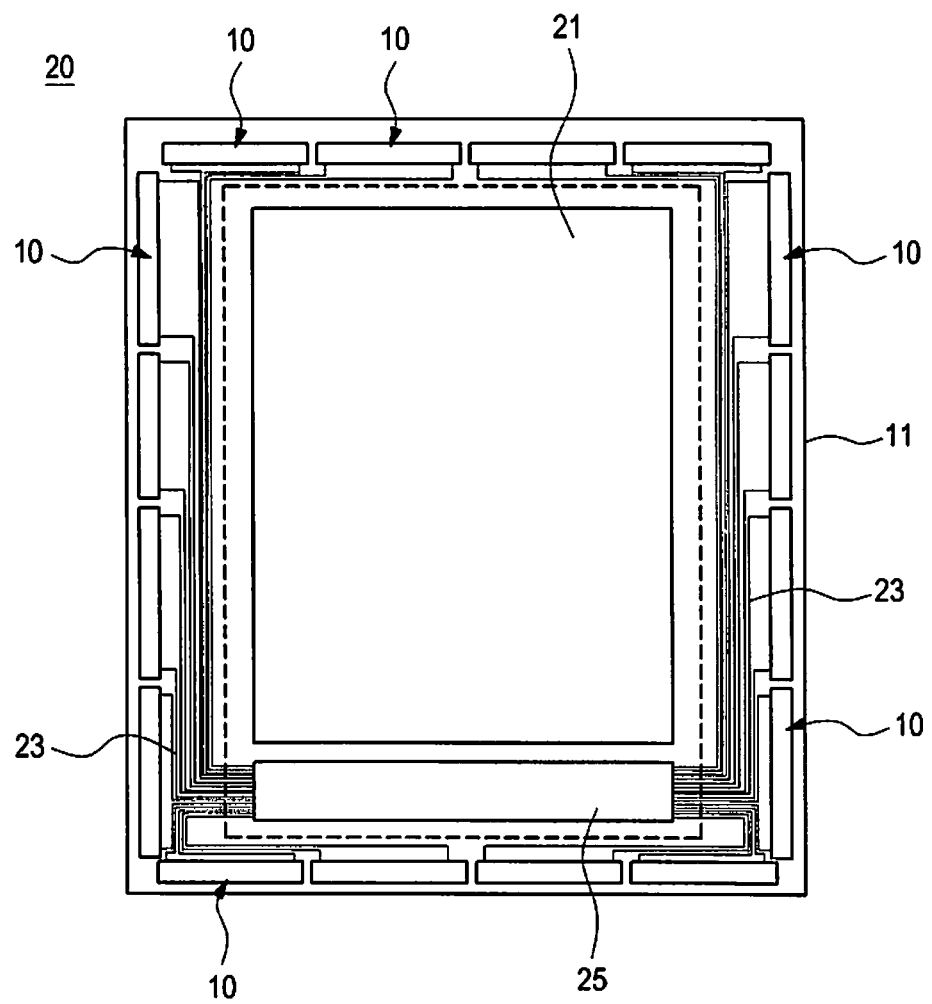
FIG. 6 is a plane view showing a state where a paste layer is formed on the flexible substrate, as illustrated in FIG. 5.

FIGS. 5 and 6 are plane views showing a structure of the flexible display device 20 to which the bending sensor 10 is applied. FIG. 5 shows a structure where the electrode patterns 13 are formed, and FIG. 6 shows a structure where the paste layer 15 is formed. A portion of the flexible substrate 11 forms a portion of the flexible display element 21 and another portion of the flexible substrate 11 forms a portion of the bending sensor 10. In other words, the single flexible substrate 11 is used to form both the flexible display element 21 and the bending sensor 10. The flexible display element 21 may be separately manufactured without sharing the bending sensor 10 and the flexible substrate 11 to be attached onto the flexible substrate 11.

On a surface of the flexible substrate 11, the plurality of electrode patterns 13 are formed adjacent to an edge of the flexible substrate 11, and each electrode pattern 13 is connected to signal lines 23 forming a printed circuit pattern. The signal lines 23 converge to a connection portion 25 positioned on a lower portion on the flexible substrate 11, and a separate flexible PCB (27 shown in FIG. 7) is connected to the connection portion 25. Some of the signal lines 23 may be connected to the flexible display element 21 to provide power and an image signal.

The signal lines 23 and the electrode patterns 13 may be formed at the same time through the aforementioned process of forming the electrode patterns 13. The paste layer 15 is coated to cover only selected portions of the electrode patterns 13, and only after the coating of the paste layer 15, each bending sensor 10 can be completed. As shown in FIG. 6, the flexible display device 20 includes four bending sensors 10 corresponding to a side of the flexible display element 21. As the signal lines 23 are connected to the electrode patterns 13 and the paste layer 15 is formed, the number of bending sensors 10 disposed along the circumference of the flexible display element 21 may vary.

Some of the electrode patterns 13 covered with the paste layer 15 may not be connected with the signal lines 23. However, it should be noted that when three or more electrode patterns 13 are formed in the single bending sensor 10, the electrode patterns 13 to which the signal lines 23 are connected are preferably disposed at an edge. In other words, if five electrode patterns 13 exist within the single paste layer 15, the electrode patterns 13 disposed at the edge are connected to the signal lines 23 and the other three electrode patterns 13 are not connected with the signal lines 23. Also in this case, if the flexible display element 21, or more specifically, the bending sensor 10, is deformed, the density of the conductive particles 17 distributed between the electrode patterns 13 within the paste layer 15 changes, such that a change in the electric resistance can be detected.

FIGS. 7 through 10 show various examples where the bending sensor 10 is disposed on the flexible display device 20.

Figure 7:
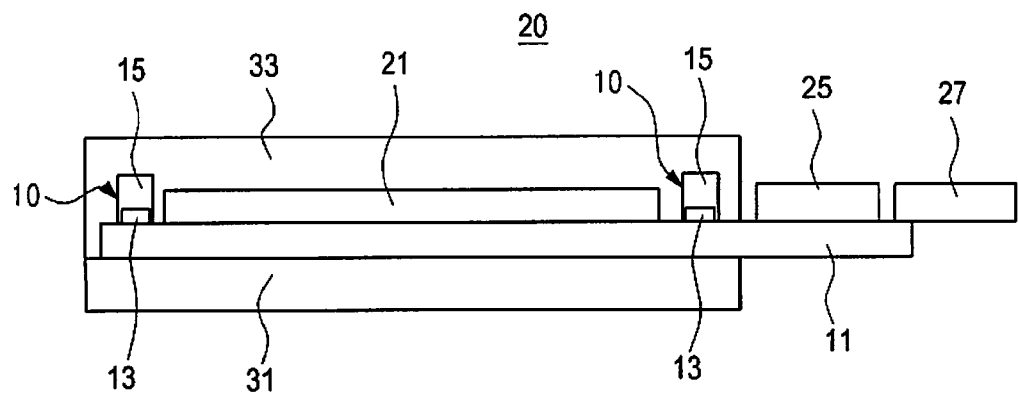
FIG. 7 is a structural diagram showing a first embodiment in which the bending sensor, as illustrated in FIG. 1, is applied to a flexible display element.

FIG. 7 is a cross-sectional view of the flexible display device 20 shown in FIG. 6, in which some portion of the bending sensor 10 is disposed between the flexible display element 21 and the connection portion 25 unlike in FIG. 6, and the separate flexible PCB 27 is connected to the connection portion 25 to connect power and various signal lines to a main circuit board of, for example, a portable terminal. In the example of the flexible display device 20 shown in FIG. 7, to protect the flexible display element 21, the electrode patterns 13 and the paste layer 15 of the flexible display device 20 may include protection layers 31 and 33 coated on both surfaces of the flexible substrate 11. The protection layers 31 and 33 are formed of, preferably, a material having high transparency and anti-scratch properties, such as acryl resin.

Figure 8:
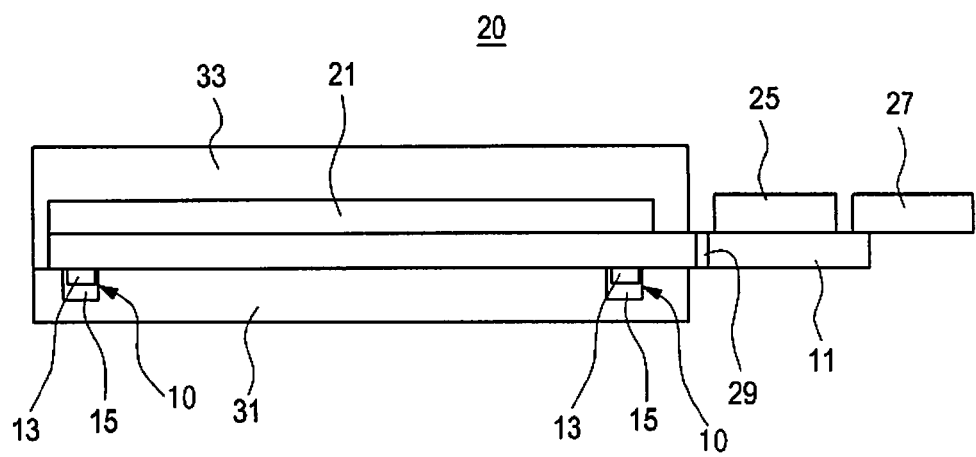
FIG. 8 is a structural diagram showing a second embodiment in which the bending sensor, as illustrated in FIG. 1, is applied to the flexible display element.

In FIG. 8, the flexible display element 21 is disposed on a surface of the flexible substrate 11, and the bending sensor 10 is disposed on the other surface of the flexible substrate 11. The connection portion 25 is formed on the same surface as a surface where signal lines of the flexible display element 21 are formed. In this case, on the flexible substrate 11 are preferably formed a through-hole 29 for connecting the signal lines connected to the bending sensor 10 to the connection portion 25. The through-hole 29 is preferably formed in the flexible substrate 11 in advance before formation of the electrode patterns 13.

Figure 9:
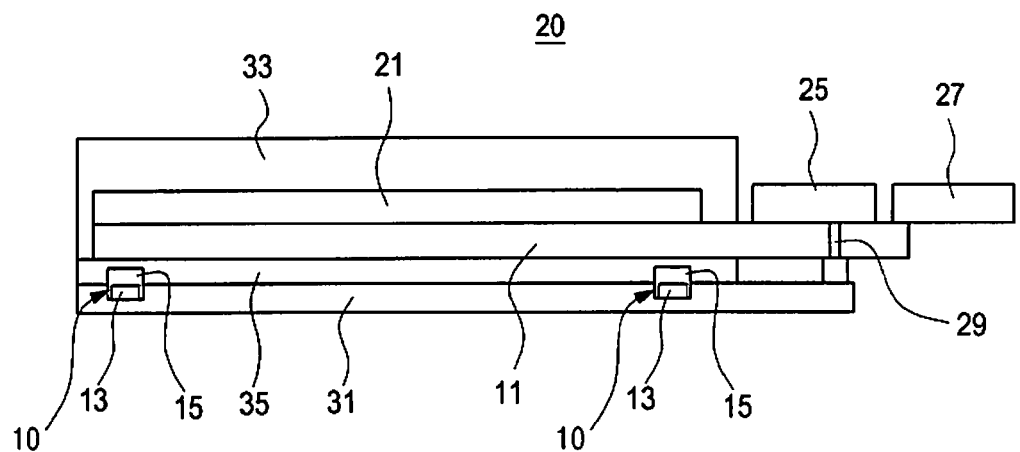
FIG. 9 is a structural diagram showing a third embodiment in which the bending sensor, as illustrated in FIG. 1, is applied to the flexible display element.
Figure 10:
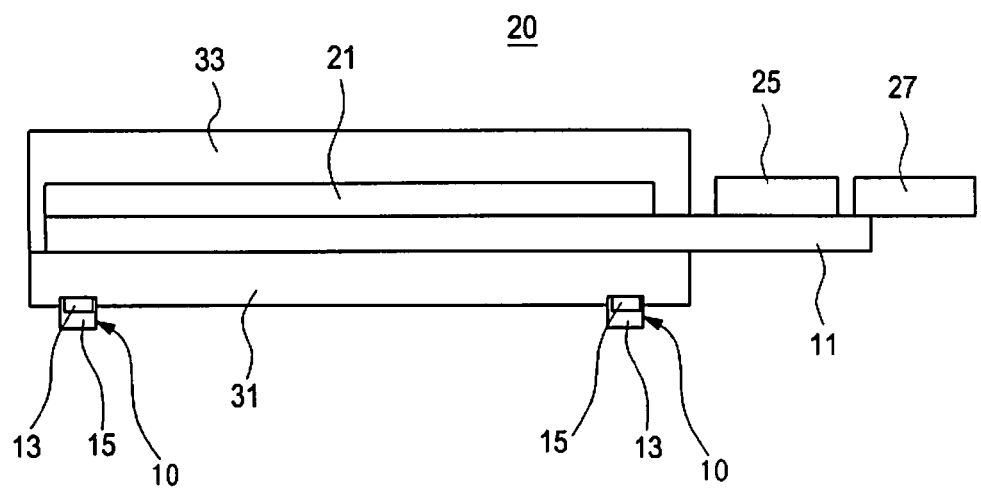
FIG. 10 is a structural diagram showing a fourth embodiment in which the bending sensor, as illustrated in FIG. 1, is applied to the flexible display element.

In FIGS. 9 and 10, the flexible display element 21 and the bending sensor 10 are disposed on different surfaces of the flexible substrate 11, and the bending sensor 10 is disposed on a protection layer. The electrode patterns 13 or the paste layer 15 of the bending sensor 10 do not necessarily contact the surface of the flexible substrate 11. In other words, the electrode patterns 13 and the paste layer 15 which are to sense deformation of a target, may be disposed in any position on the target. However, obviously, if the target is concrete or synthetic resin, or a portion of an aircraft or a ship, the bending sensor 10 fabricated to include the flexible substrate 11 has to be attached to a desired position on the target.

Referring to FIGS. 9 and 10, when the bending sensor 10 according to the present invention is to be applied to a product having a thickness of several μms through several tens of μms, such as a display element using an active organic light-emitting diode, it is desirable to form the electrode patterns 13 and the paste layer 15 on a protection layer, or more specifically, on a surface of the protection layer 31 formed on a surface other than the flexible display element 21. To form the electrode patterns 13 and the paste layer 15 on the surface of the protection layer 31, photo-etching, printing, or screen-printing may be used as stated above.

The protection layer 31 may be attached to the flexible substrate 11 through a separate adhesive layer 35 or through thermo-compression. In FIG. 9, the electrode patterns 13 and the paste layer 15 are disposed between the flexible substrate 11 and the protection layer 31, and the protection layer 31 is attached to the flexible substrate 11 through the adhesive layer 35, and the electrode patterns 13 are disposed on the surface of the protection layer 31 which faces the flexible substrate 11. In FIG. 10, the protection layer 31 is directly attached to the flexible substrate 11 through thermo-compression, and the electrode patterns 13 are disposed on an outer surface of the protection layer 31.

As shown in FIGS. 7 through 10, when the bending sensor 10 is formed, it is not necessary to form the electrode patterns 13 directly on the flexible substrate 11. That is, by disposing the electrode patterns 13 and the paste layer 15 such that a predetermined degree of displacement can be provided according to deformation of a monitoring target, the bending sensor 10 can be sufficiently operated.

FIGS. 11A through 11D sequentially show a process of fabricating the bending sensor 10.

Figure 11A:
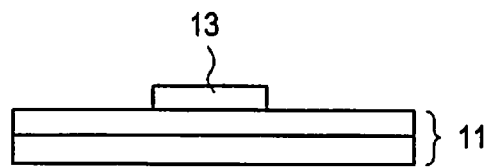
FIGS. 11A through 11D are views depicting a first embodiment of a process of fabricating the bending sensor, as illustrated in FIG. 1.

To fabricate the bending sensor 10, the flexible substrate 11 may use a substrate of the flexible display element 21 or a substrate to which the flexible display element 21 is to be attached. The electrode pattern 13 may be formed concurrently with a process of forming signal lines and power lines connected to the flexible display element 21. FIG. 11A shows a state where the electrode pattern 13 is formed on the flexible substrate 11. A process of forming the electrode pattern 13 of the bending sensor 10 is similar to a photo-etching process mentioned previously. That is, a conductive material layer is formed through deposition and washed if necessary, and photoresist is coated onto the conductive material layer and then hardened, after which a photo-mask is disposed on the photoresist, which is then exposed and developed. Thereafter, printed circuit patterns such as other signal or power lines are formed through etching, and at the same time, the electrode pattern 13 is formed.

Figure 11B:
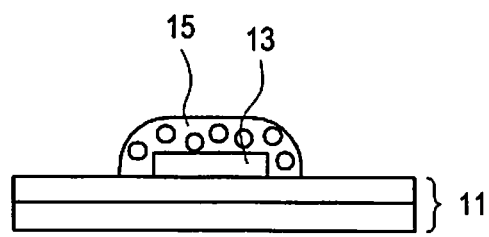

After the electrode pattern 13 is formed, paste is coated to cover the electrode pattern 13, thus forming the paste layer 15. The paste may be coated through printing or screen-printing. FIG. 11B shows a state where the paste layer 15 is formed. As mentioned previously, the paste layer 15 contains the conductive particles 17 to allow current to flow between the electrode patterns 15. Deformation of the bending sensor 10, or more specifically, the flexible substrate 11, changes the distribution density of the conductive particles 17, causing a change in the electric resistance between the electrode patterns 13. Through the change in the electric resistance, the direction and degree of deformation of the flexible substrate 11 can be checked.

Figure 11C:
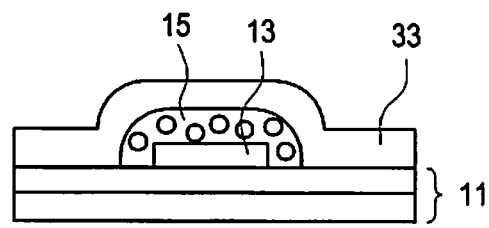
Figure 11D:
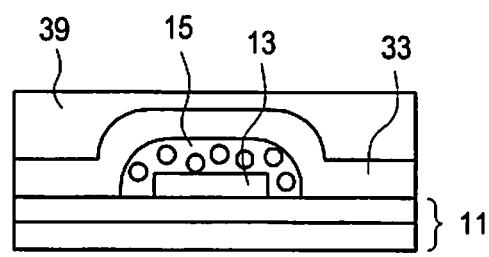
Figure 12A:
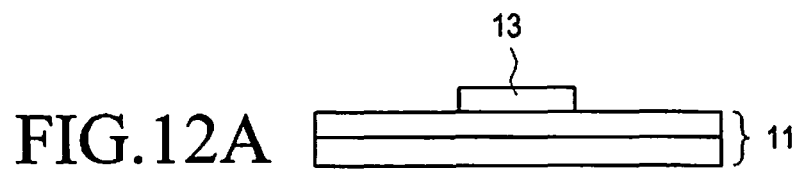
FIGS. 12A through 12E are views depicting a second embodiment of a process of fabricating the bending sensor, as illustrated in FIG. 1.
Figure 12B:
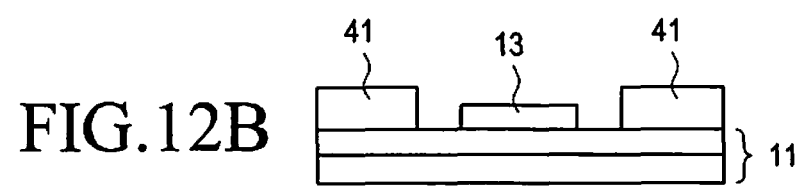
Figure 12C:
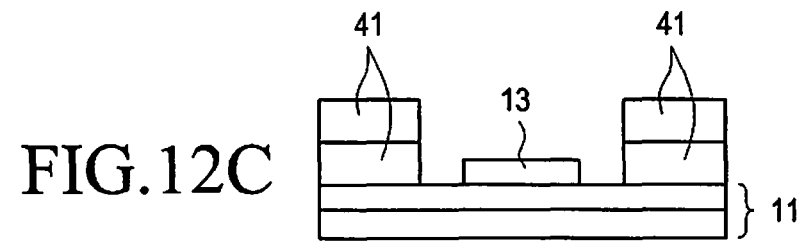
Figure 12D:
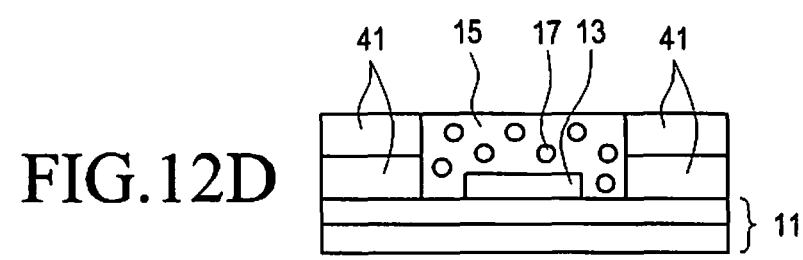
Figure 12E:
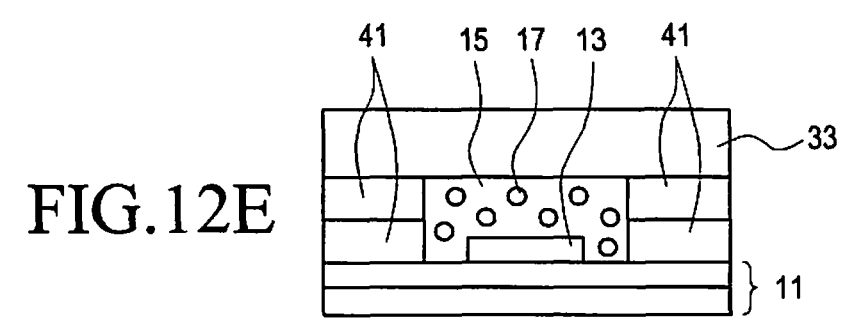

FIGS. 11C and 11D show a state where a protection layer 33 is formed on the paste layer 15 and a state where a protection layer 39 is formed on the protection layer 33. As long as the bending sensor 10 is formed on the flexible substrate 11 of the flexible display element 21, the protection layers 33 and 39 may also be formed in the same manner as the protection layer formed on the surface of the flexible display element 21. In FIGS. 11A through 11D, the protection layer 33 is a silicon nitride (SiNx) layer and the protection layer 39 is an acryl layer, and in particular, the acryl layer 39 formed on the outer surface has superior anti-scratch properties. The cracks 19 are preferably formed in the paste layer 15 prior to formation of the protection layers 33 and 39.

The bending sensor 10 fabricated as described above is attached to a structure to measure the direction or degree of deformation of the structure. As stated above, the electrode patterns 13 may be formed in a process of forming signal lines on the substrate of the flexible display element 21, which means that the bending sensor 10 may be fabricated integrally with the flexible display element 21.

As shown in FIGS. 8 through 10, when the electrode patterns 13 are formed on the surface that is different from the surface where the flexible display element 21 is formed, it is desirable to form a through-hole for connecting the connection portion 25 with the power line connected to the electrode patterns 13. As such, even when the connection portion 25 and the electrode patterns 13 are formed on different surfaces, the power can be simply provided to the electrode patterns 13.

FIGS. 12A through 12E sequentially show another process of fabricating the bending sensor 10. This process is different from that disclosed in the foregoing embodiment in that a protrusion portion 41 surrounding a region where the electrode pattern 13 is formed is further formed on the flexible substrate 11. The protrusion portion 41 is formed to surround the region where the electrode pattern 13 is formed, thereby defining the region where paste is coated. In other words, the paste, because of its viscosity, may spread to neighboring regions in spite of printing or screen-printing. That is, although the paste has to be applied within a designed region, it may be out of the designed region due to the viscosity and surface tension of the paste. Thus, the paste may spread to an unnecessary region or other signal lines, and to prevent this problem, the protrusion portion 41 is formed. The protrusion portion 41 may be formed by causing a portion of the photoresist to remain during the process of forming the electrode pattern 13. After formation of the electrode pattern 13, additional photo-etching may be performed to form the protrusion portion 41. However, to prevent the already formed electrode pattern 13 from being removed during development and etching for formation of the protrusion portion 41, processing conditions have to be different.

Figure 13:
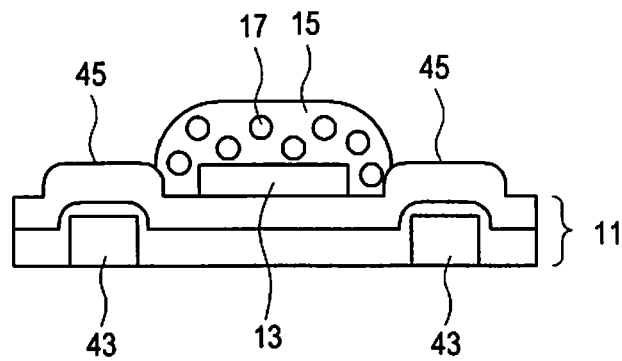
FIG. 13 is a diagram depicting a modified example of a second embodiment of a process of fabricating the bending sensor, as illustrated in FIG. 1.

FIG. 13 shows a structure in which the shape of the flexible substrate 11 is used to form a protrusion portion 45 for defining the coating region of the paste covering the electrode pattern 13, without a separate photo-etching process. In FIG. 13, during fabrication of the flexible substrate 11, a dummy 43 is disposed in a position corresponding to a region where the electrode pattern 13 is to be formed, thereby deforming the flexible substrate 11 and thus forming the protrusion portion 45.

On the surface of the bending sensor 10 where the protrusion portion 45 is formed, a protection layer may be formed after formation of the paste layer 15.

FIGS. 14A through 14C and 15 illustrate examples of the flexible display device 20 to which the bending sensor 10 is applied.

Figure 14A:
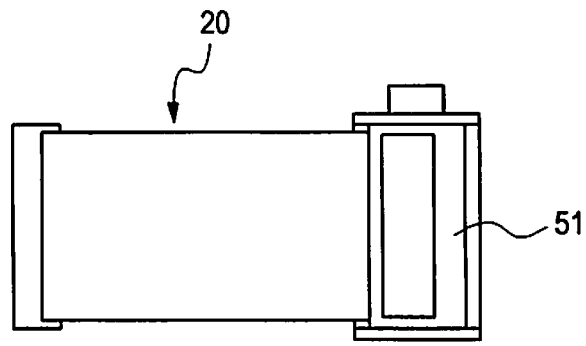
FIGS. 14A through 14C and 15 are diagrams depicting examples of a flexible display device to which the bending sensor, as illustrated in FIG. 1, is applied.
Figure 14B:
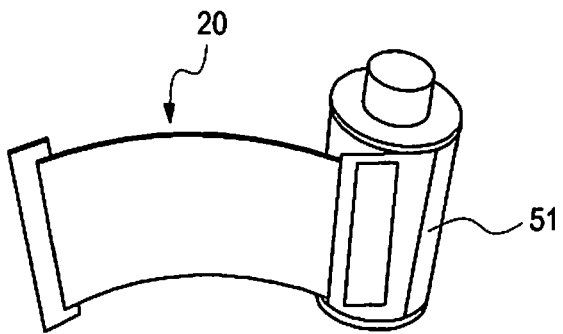
Figure 14C:
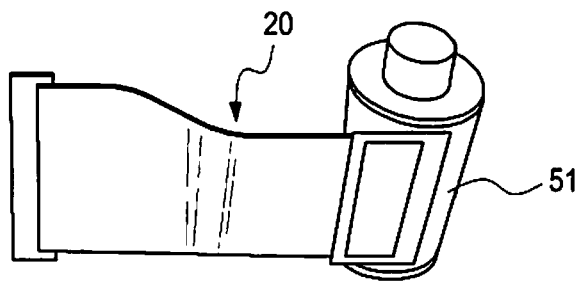

FIGS. 14A through 14C illustrate examples in a state where the flexible display device 20 is activated, that is, displays a screen. If a device 51 having the flexible display device 20 installed therein is a digital camera, as shown in FIG. 14A, the unfolding of the flexible display device 20 is sensed by the bending sensor 10, such that the device 51 is set to a photographing mode. If the photographing mode is switched to a search mode for captured images by using a separate switch, the flexible display device 20 may display an image file stored in the device 51.

When the device 51 is in the photographing mode, as shown in FIG. 14B, the flexible display device 20 may be bent forward or backward to adjust a shutter speed or to select a photographing option such as figure photographing, panorama photographing, landscape photographing, or night view photographing. This may be previously programmed during the fabrication of the device 51 or may be programmed to be selected according to a user's preference. When the edge of the flexible display device 20 is moved to twist the entire screen as shown in FIG. 14C, photographing sensitivity may be adjusted.

When the device 51 is in the search mode for already captured images, as shown in FIG. 14B or 14C, the flexible display device 20 is deformed to display a next image or a previous image or adjust a brightness of the screen.

Figure 15:
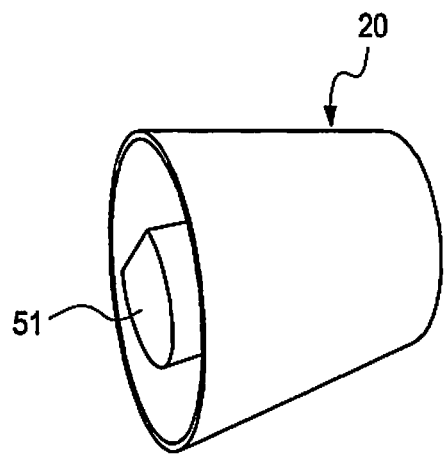

As shown in FIG. 15, when the flexible display device 20 is rolled in a cylindrical form or a conical form to be positioned around a circumference of the device 51, the device 51 may be switched to a moving image capturing mode or a voice-recording mode.

As such, when the bending sensor 10 is applied to the flexible display device 20, screen adjustment of the flexible display device 20, and further switching of the operation mode of the device 51 may be implemented based on various deformations of the flexible display device 20.

As can be seen from the foregoing description, when the bending sensor is applied to the flexible display device, the electrode patterns and the paste layer may be formed on the flexible substrate which is to form the flexible display element, thereby forming a bending sensing structure, substantially with a thickness of the flexible display element or less. Therefore, the thickness of the flexible display device can be easily reduced. Moreover, deformations of various directions can be sensed through disposition directions of the electrode patterns, thereby making it easy to sense the degree and direction of folding or bending. Through the bending sensor, a screen display region and the direction of the flexible display element can be easily controlled. Furthermore, during the process of manufacturing a TFT through a series of processes of deposition of the conductive material, washing, photoresist coating, exposure, development, and etching, or through the same manufacturing process, the electrode patterns can be formed, facilitating mass production and thus reducing fabrication costs.

While detailed embodiments of the present invention have been described, it would be obvious to those of ordinary skill in the art that various changes may be made without departing from the scope of the present invention.

What is claimed is:

1. A bending sensor comprising:
  a flexible substrate;
  at least a pair of electrode patterns spaced apart from each other provided on the flexible substrate; and
  a paste layer containing conductive particles, the paste layer being coated onto the flexible substrate where the electrode patterns are formed,
  wherein when the flexible substrate is bent, the density of the conductive particles between the electrode patterns changes, such that an electric resistance between the electrode patterns also changes, and
  wherein the flexible substrate comprises a flexible display element attached onto a surface thereof, and the electrode patterns are disposed in at least one of a longitudinal direction and a widthwise direction of the flexible substrate.

2. The bending sensor of claim 1, further comprising a plurality of cracks formed in a surface of the paste layer.

3. The bending sensor of claim 1, wherein the electrode patterns are disposed on the surface of the flexible substrate.

4. The bending sensor of claim 3, wherein the electrode patterns are disposed adjacent to an edge of the flexible display element.

5. The bending sensor of claim 3, wherein the electrode patterns are disposed in the longitudinal direction and the widthwise direction of the flexible substrate, while surrounding an edge of the flexible display element.

6. The bending sensor of claim 3, further comprising a protection layer coated onto a surface of the flexible substrate, wherein the electrode patterns and the paste layer are disposed within the protection layer.

7. The bending sensor of claim 1, wherein the electrode patterns are disposed on another surface of the flexible substrate.

8. The bending sensor of claim 7, further comprising a protection layer coated onto the another surface of the flexible substrate, wherein the electrode patterns and the paste layer are disposed within the protection layer.

9. The bending sensor of claim 8, further comprising an adhesive layer between the protection layer and the flexible substrate, wherein the electrode patterns are disposed on the protection layer, and the paste layer is disposed on the adhesive layer.

10. The bending sensor of claim 7, further comprising a protection layer coated onto the another surface of the flexible substrate, wherein the electrode patterns and the paste layer are disposed on a surface of the protection layer.

11. The bending sensor of claim 1, further comprising a protrusion portion formed on the flexible substrate to surround a region where the electrode patterns are disposed.

* * * * *